Aug. 16, 1927.
L. C. FREEMAN
SEAT CONSTRUCTION
Filed June 15, 1925
1,639,371
2 Sheets-Sheet 1
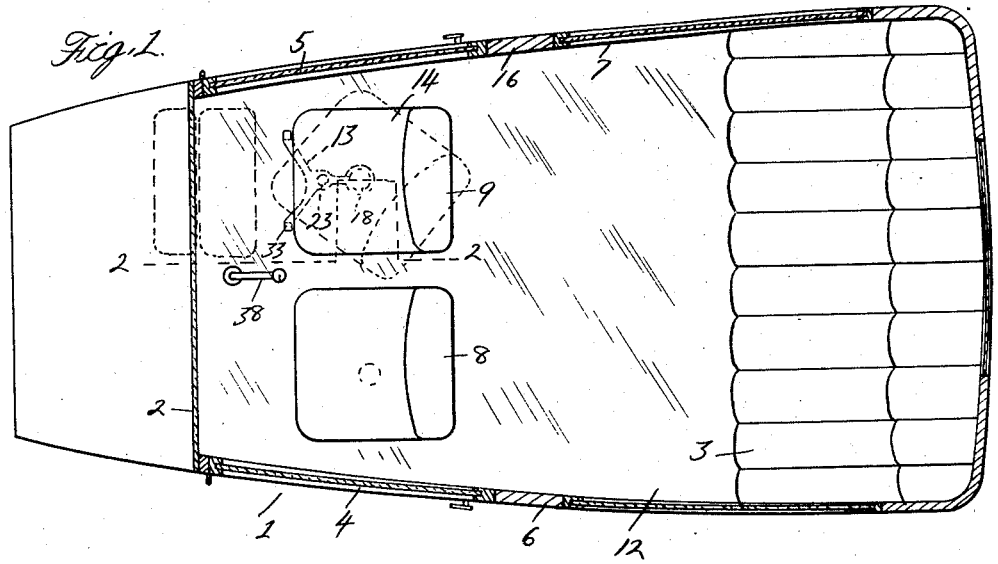
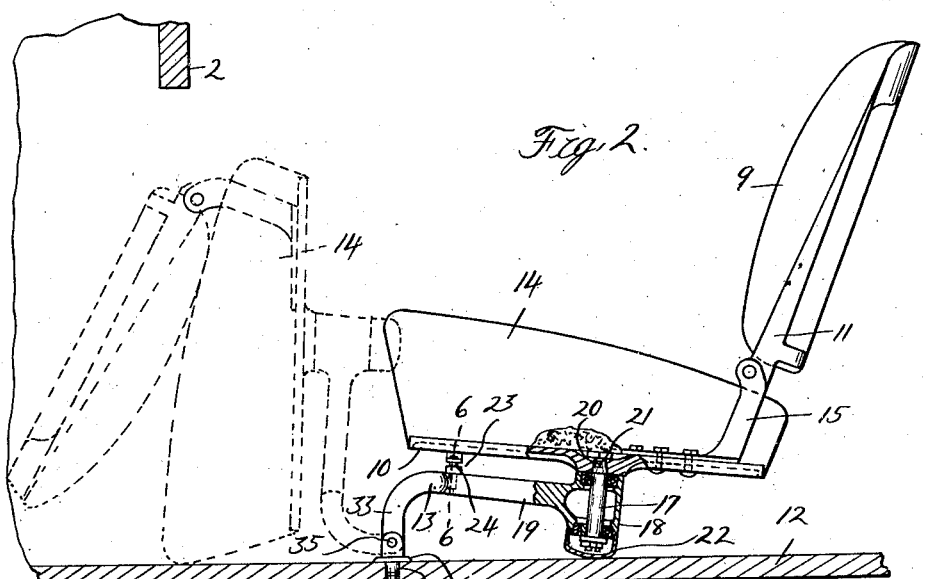
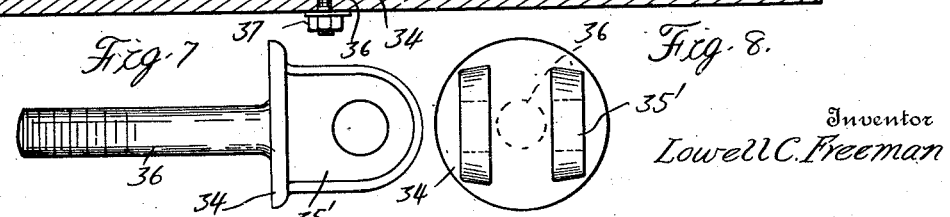
Inventor
Lowell C. Freeman
By Whittemore Hulbert Whittemore
& Belknap   Attorneys Aug. 16, 1927.
L. C. FREEMAN
1,639,371
SEAT CONSTRUCTION
Filed June 15, 1925
2 Sheets-Sheet 2
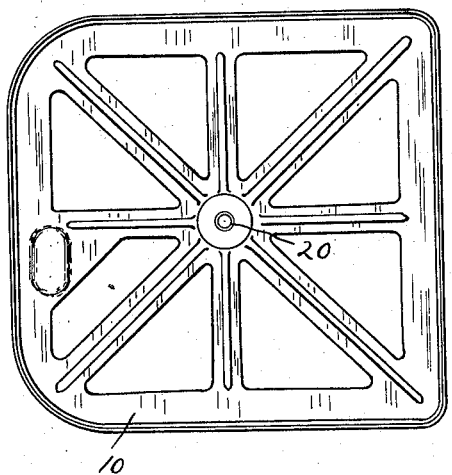
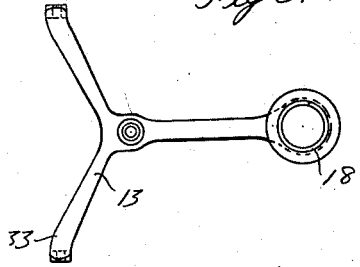
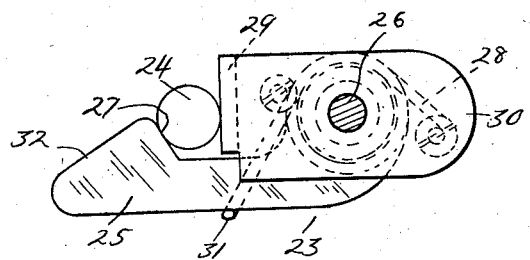
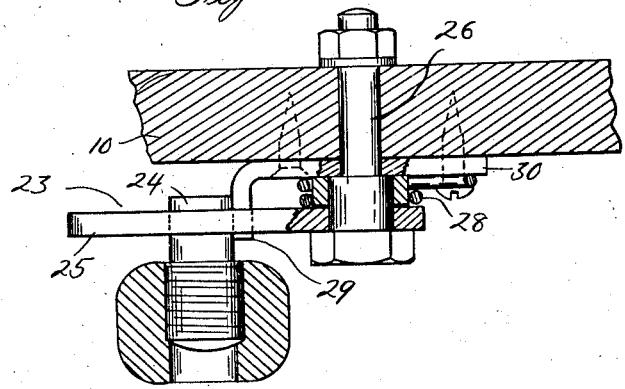
Inventor
Lowell C. Freeman
By Whittemore Hulbert Whittemore
& Belknap    Attorneys Patented Aug. 16, 1927.

1,639,371

UNITED STATES PATENT OFFICE.

LOWELL C. FREEMAN, OF DETROIT, MICHIGAN, ASSIGNOR TO HUPP MOTOR CAR CORPORATION, OF DETROIT, MICHIGAN, A CORPORATION OF VIRGINIA.

SEAT CONSTRUCTION.

Application filed June 15, 1925. Serial No. 37,328.

This invention relates generally to seat constructions and refers more particularly to a folding swivel seat construction designed for use beside the driver's seat in a motor vehicle body.

One of the essential objects of the invention is to provide a seat of this type which may be readily revolved from a position parallel to the median line of the vehicle body to a position inclined outwardly from the median line so that a relatively wide unobstructed passage will be provided between the seat and door jamb.

Another object is to provide a revoluble seat which may be readily folded forwardly beneath the instrument board of the vehicle body so that a relatively wide unobstructed passage will be provided between the folded seat and driver's seat to permit the driver to move freely to or from his seat, and clearance will be provided between the folded seat and transmission lever of the vehicle to permit the driver to shift gears without any interference.

A further object is to provide a neat and compact seat that is strong and durable in construction and that may be manufactured at a comparatively low cost.

With the above and other objects in view the invention consists in certain novel features of construction, combinations and arrangements of parts as will be more fully described and particularly pointed out in the appended claims.

In the accompanying drawings:

Figure 1 is a horizontal sectional view through a vehicle body of the closed type equipped with a seat embodying my invention.

Figure 2 is a vertical sectional view taken on the line 2—2 of Figure 1.

Figure 3 is a top plan view of the supporting spider.

Figure 4 is a bottom plan view of the seat base.

Figure 5 is a top plan view of the catch.

Figure 6 is a fragmentary cross sectional view taken on the line 6—6 of Figure 2.

Figure 7 is a detail view of one of the floor brackets.

Figure 8 is a top plan view of the construction shown in Figure 7.

Referring now to the drawings the numeral 1 designates a vehicle body of the closed type having an instrument board 2 at the forward end thereof, a fixed transversely extending seat 3 at the rear end thereof, and suitable door openings 4 and 5 respectively in the sides 6 and 7 thereof, preferably adjacent to the instrument board 2.

Located in rear of the instrument board 2 are two seats 8 and 9 respectively which are preferably spaced laterally apart between the door openings 4 and 5. The seat 8 opposite to the door opening 4 is preferably the driver's seat and may be any construction desired, while the seat 9 opposite to the door opening 5 is designed to accommodate a passenger and is preferably of the folding revoluble type. As shown, this seat 9 has a flat bottom or base 10 and a hinged back 11 and is supported above the floor 12 of the vehicle body by means of a suitable spider 13. The base 10 may be any suitable shape and may be constructed of any suitable material, while the back 11 may likewise be constructed in any suitable manner and may be hingedly connected to the base 10 by any suitable means. As shown, the base 10 is preferably a malleable casting and conforms in shape to the shape of the upholstered body portion 14 of the seat, while the back 11 is preferably connected to the base 10 at the rear edge thereof by suitable hinge brackets 15.

In order that the seat 9 may be revolved from the position shown in full lines to the position shown in dotted lines A in Figure 1 of the drawings so that a free and unobstructed passage will be provided between the seat 9 and door jamb 16, the base 10 of the seat is preferably swiveled upon a vertical spindle 17 extending longitudinally of a cylindrical enlargement 18 at the free end of the rearwardly projecting leg 19 of the spider 13. As shown, the base 10 of the seat has a central tapered opening 20 that receives the correspondingly tapered upper end portion 21 of the spindle 17, while the latter is preferably mounted in standard Timken bearings located at opposite ends of the cylindrical enlargement 18. Any suitable means such as the cup-shaped sheet metal cap 22 may be secured to the lower end of the enlargement 18 to conceal the lower end of the spindle 17 and the lower Timken bearings. As shown in Figure 2 of the drawings, this cap 22 rests upon the floor 12 of the vehicle body when the seat 9 is in open or operative position.

With this construction a suitable catch 23 is preferably provided for normally holding the seat 9 parallel to the median line of the vehicle body. As shown, a pin 24 projects upwardly from the spider leg 19, preferably at the forward end thereof, and is adapted to be engaged by a horizontally pivoted arm 25. This arm 25 is pivoted at its rear end upon a vertical bolt 26 secured to the base 10 of the seat and is preferably provided at its forward free end with a lateral inclined shoulder 27 for engagement with the pin 24. To insure positive engagement of the shoulder 27 with the pin 24, I preferably provide a suitable spring 28 which normally holds the arm 25 against the depending lug 29 of a plate 30 which is secured to the base 10 of the seat. This spring 28 may be any suitable construction but preferably has a portion coiled about the bolt 26 and has an end portion 31 hooked over the outer edge of the horizontal arm 25. To facilitate engagement of the shoulder 27 with the pin 24, the arm 25 is preferably provided between the forward free end thereof and the shoulder 27 with an inclined edge portion 32 which serves as a cam for deflecting the arm 25 laterally preliminary to the shoulder 27 being forced by the spring 28 into latching engagement with the pin 24. Thus, with this construction, the seat 9 will normally be held in the position shown by full lines in Figure 1 of the drawings. However it may be readily turned to the position shown by dotted lines A by merely exerting sufficient pressure on the seat in the direction of the arrow shown in Figure 5 of the drawings to cause the shoulder 27 of the arm 25 to become disengaged from the pin 24. If desired, this may be accomplished by the passenger while on the seat 9. When the seat 9 is turned back to the full line position shown in Figure 1, the shoulder 27 of the arm 25 will automatically move into latching engagement with the pin 24 to hold the seat in proper position.

When not in use the seat 9 is preferably folded forwardly beneath the instrument board 2 of the vehicle body. To accomplish this the forward legs 33 of the spider are hingedly connected to suitable floor brackets 34 by means of horizontal transversely extending pins 35. As shown in Figure 7 of the drawings these brackets 34 have U-shaped heads 35' that receive the feet 33 of the spider and have depending shanks 36 which extend through the floor 12 of the vehicle body and are held in position by suitable nuts 37. Thus, when it is desired to move the seat 9 forwardly, the back 11 thereof is first folded over the upholstered body 14, whereupon the seat 9 may be folded forwardly beneath the instrument board 2 as shown by dotted lines B in Figure 1 of the drawings. When in this position a relatively wide passage is provided between the driver's seat 8 and adjacent corner of the folded seat 9. Moreover sufficient clearance is provided between the folded seat 9 and transmission lever 38 of the vehicle to permit the said lever to be operated without any interference.

Thus, from the foregoing description, it will be readily apparent that the seat 9 may be readily turned at an angle to the median line of the vehicle body to provide a clear passage which may be used for entering or leaving the vehicle body. Also it will be apparent that this may be accomplished by a parent while on said seat without obstructing the passage referred to. Moreover the driver's seat 8 is spaced a sufficient distance from the nearest floor bracket 34 to provide a passage between the seats 8 and 9 which may be used by the driver when going to or from his seat. Furthermore the arrangement is such that when the seat 9 is folded, a sufficient passage is provided between the seats 8 and 9 to permit the driver to move freely to or from his seat. Inasmuch as the swivel mounting for the seat 9 is carried by the floor brackets 25 it will also be apparent that the space in rear of the seat 9 when folded will be free of any objectionable obstructions.

While it is believed that from the foregoing description the nature and advantages of the invention will be readily apparent, I desire to have it understood that I do not limit myself to what is herein shown and described, and that such changes may be resorted to when desired as fall within the scope of what is claimed.

What I claim as my invention is:

1. The combination with a vehicle body having a floor board, of a spider mounted on said floor board and having a rearwardly projecting leg, an enlargement at the free end of said leg adapted to rest on said floor board, a spindle mounted in said enlargement, and a seat mounted to rotate on said spindle.

2. The combination with a vehicle body having a floor board, of a spider hingedly mounted on said floor board and having a rearwardly projecting leg, an enlargement at the free end of said leg, a spindle mounted in said enlargement and having a tapered end portion, and a seat having a base provided with a tapered opening receiving the tapered end portion of said spindle.

3. The combination with a vehicle body having a floor board, of a spider hingedly mounted on said floor board having a rearwardly projecting leg, a revolubly seat mounted on said spider, and cooperating elements carried respectively by said leg and seat normally holding the latter in a predetermined position.

4. The combination with a vehicle body having a floor board and a revoluble seat having a base, of a spider hingedly mounted on said floor board having a rearwardly projecting leg, a pin carried by said leg, and a catch carried by the base engageable with the pin for normally holding the seat in a predetermined position.

5. The combination with a vehicle body having a floor board and a revoluble seat having a base, of a spider hingedly mounted on said floor board, a pin projecting upwardly from said spider, an arm pivotally mounted on said base and having an inclined shoulder engageable with said pin, and yieldable means associated with said pivot for normally holding said arm against said pin.

6. The combination with flooring of a vehicle body, a spider hingedly mounted on said flooring and having an enlargement at its free end adapted to rest on said flooring, a spindle carried by said enlargement, and a seat carried by said spindle.

7. The combination with flooring of a vehicle body, a spider hingedly mounted on said flooring and having a portion at its free end adapted to rest on said flooring, a spindle journaled in said portion, and a seat rigidly secured to said spindle.

In testimony whereof I affix my signature.

LOWELL C. FREEMAN.